(12) United States Patent
Kohli et al.

(10) Patent No.: US 8,271,933 B1
(45) Date of Patent: Sep. 18, 2012

(54) PIN UNSPECIFIC DEVICE PLANNING FOR PRINTED CIRCUIT BOARD LAYOUT

(75) Inventors: Vikas Kohli, Noida (IN); Dhamarajan Sankaran, Nodia (IN); Steve R. Durrill, Campbell, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 314 days.

(21) Appl. No.: 12/650,346

(22) Filed: Dec. 30, 2009

(51) Int. Cl.
*G06F 17/50* (2006.01)
(52) U.S. Cl. ........................................ 716/139; 716/137
(58) Field of Classification Search .................. 716/137, 716/139
See application file for complete search history.

(56) References Cited

U.S. PATENT DOCUMENTS

| | | | |
|---|---|---|---|
| 4,638,442 A * | 1/1987 | Bryant et al. | 716/126 |
| 2010/0058277 A1* | 3/2010 | Anantharaman et al. | 716/18 |

OTHER PUBLICATIONS

Jou, Jer-Min et al., "A Hierarchical Interface Design Methodology and Models for SoC IP integration," Circuits and Systems, 2002,ISCAS 2002, IEEE International Symposium on vol. 2, May 26-29, 2002, pp. II-360-II363, vol. 2 Digital Object Identifier 10,1109/ISCAS.2002.1010999.

* cited by examiner

*Primary Examiner* — Vuthe Siek
(74) *Attorney, Agent, or Firm* — Kilpatrick Townsend & Stockton LLP

(57) ABSTRACT

A printed circuit board (PCB) block diagram tool for block diagram level editing of a PCB design abstracted from a PCB physical layout tool is disclosed. The PCB block diagram tool includes a plurality of interface objects, a plurality of block objects and interconnect lines. The plurality of interface objects represents interfaces between components. Each of the plurality of interface objects include a plurality of signal, power and ground signal lines without defined physical assignment to pin or pad. The plurality of block objects represents a plurality of physical objects in the PCB physical layout tool. The plurality of blocks are configured to accept the plurality of interface objects. Interconnect lines connect the plurality of interface objects between the plurality of block objects.

17 Claims, 15 Drawing Sheets

PIN UNSPECIFIC DEVICE PLANNING FOR PRINTED CIRCUIT BOARD LAYOUT

This application is related to co-pending: U.S. patent application Ser. No. 12/650,349, filed on the same date as the present application, entitled "PRINTED CIRCUIT BOARD PIN GROUP MANIPULATION"; and U.S. patent application Ser. No. 12/650,352, filed on the same date as the present application, entitled "HIERARCHICAL EDITING OF PRINTED CIRCUIT BOARD PIN ASSIGNMENT"; which are hereby expressly incorporated by reference in their entirety for all purposes.

BACKGROUND

This disclosure relates in general to engineering design automation (EDA) tools and, but not by way of limitation, to printed circuit board (PCB) tools that facilitate co-design of the package, integrated circuit (IC) and/or PCB.

PCB layout is a process prone to error. Interfaces and custom packages require hand-layout that are susceptible to human error. The exchange of signal names and pin assignments between different PCB and package layout tools is often done with a flat netlist or spreadsheet file. By far, the most prevalent approach to exchanging interface information today is using a spreadsheet to show the logical to physical assignments. For a connector that is 4×40 pins spreadsheet would be used to model this as 4 rows and 40 columns. The name of the signal would be entered into each column and the cell numbering would be used for the corresponding pin assignment. For a ball-grid array or bump pattern on a die the same approach is taken but the matrix is often much larger. The output of spreadsheet or other basic text file that can be imported into a connectivity tool, schematic in many situations, to create the electrical connectivity with actual pin assignments. This manual solution relies on the use of a signal name that is consistent across all tools and domains that are being operated upon.

When PCB layout and editing is done, it is pin-by-pin and wire-by-wire. Any naming conventions must be properly followed or connections between package and die or between connectors will route incorrectly. Each wire is connected individually or from a flat netlist, which has no appreciation of how signals are grouped. Simple naming errors get propagated through the design and requires extensive manual verification and possibly work-arounds should any errors not be found early in the process.

Tools for PCB layout often have a library of defined parts. In each library component, the corresponding package is defined on a pin-by-pin basis. Wires can be added to connect pins from the various packages. The wires can be read from a flat netlist, but there is not the ability to group similar signals or move them around on custom packages during the design process. With custom packages and new parts being common, libraries are inevitably out of date. When working with a package in the PCB layout all the pins are flattened as there is no grouping. Finding simple errors is difficult as designs get larger and more complex.

Conventional systems have difficulty when interfacing to different components with suites of different EDA tools. Keeping track of board signals with connectors, custom packages and co-design packages uses manual naming. Between tools, assigned signal names must correlate to provide proper connectivity between these interfaces. Signal connections to a pair of connectors that are used to join two boards, either via a connector to connector mating or using a cable, should be simple, but in practice are prone to introducing errors. Also, the signal to bump (die connection) and signal to ball (IC package connection) are difficult to coordinate so that the electrical and physical constraints in each domain are met. Without an optimal assignment in these domains the physical routing resources become cost prohibitive. Managing the tradeoffs between domains and ensuring that the electrical and physical requirements are difficult to manage.

SUMMARY

In one embodiment, a printed circuit board (PCB) design flow begins with block-level diagrams to accelerate netlist capture. Instead of connecting two components using a scalar (e.g., RESET) or vectored signal (e.g., DATA<31.0>), each component object is comprised of a set of interface objects that each could include scalars, vectors, differential pairs, etc. arranged in a group without defining individual pin assignments. The interface object is labeled and defined to include grouping, sub-grouping, signal names, voltage requirements, and layout rules. The interface object can be dropped onto any number of block objects to define an interface for a component object at this layer of abstraction. A component object can be mapped to a physical object to define dimensioning and pins. Libraries of interface blocks and block objects are used to define the abstracted connection between two component objects. Each interface block could potentially define many hundreds or thousands of signals that may later be mapped to individual pins, but pin assignment is not necessary while defining the component objects and their interconnection.

In one embodiment, the logical assignment of block objects and interface blocks can be exported to a physical PCB layout tool that conventionally would only accept physical objects with signals mapped to each pin. A component object can have interfaces defined without mapped physical resources (e.g., pin number or pad number) assigned to all signals in an interface object. In one embodiment, creating an interface object that does not require physical resource mapping means the user need not spend valuable time making dummy assignments to physical resources, or trying to create an optimized assignment in a non-floorplanning environment (e.g. a spreadsheet program). After interacting with a block diagram tool where the designer defines object blocks with their interface blocks and interconnection, an organized set of nets ready to be assigned in the PCB layout tool.

In one embodiment, the designer views the unassigned logical assignments for the various component objects and their interfaces in the PCB layout tool. Individual rat lines to balls or bumps that make it very hard to visualize what needs to be optimized. Grouping of the unassigned rat lines allows showing the logical instead of physical connections such that the PCB design tool would only display that the nets are not attached to a ball or bump. As the user begins assigning the groups of nets to smaller sets of physical resources the assignment is seen to a subset or region instead of to each specific resource for each signal. Reducing the complexity that is seen by the user will provide a cleaner environment for optimization. The user starts with a single logical assignment to the device and after partitioning the signals will gradually see how the physical connections are going to be assigned. At the end of the process, there is a one-on-one mapping of signal to resource.

In one embodiment, the instances of interface objects are mapped and can be manipulated as a group in the PCB layout tool. This a group of signals to be moved as a group in addition to allowing individual signal assignment. For example, a designer assigning a PCI-X interface instance to a set of resources will know by viewing the definition of the interface how signals are related in groups, sub-groups, sub-sub-groups etc. Viewing interface instance with some grouping when assigning signals aids in making intelligent assignments in one embodiment. Without manipulation that operates on groups of signals arranged according to layout rules, the designer may make net to resource connections that are more prone to have violations of layout rules. Conventionally, the only way to pass signal information that can guide one-by-one layout is by using well formed signal names.

In one embodiment, interface instances are assigned to physical and logical resources in hierarchically-arranged groups allows. The user can select interface instances or portions of one in a group, sub-group or sub-sub-group in the various tools in the design flow. The organization is mapped throughout the various tools. This mapping would initially be defined at a global level meaning that the assignment is to a group, not a specific assignment from a signal to a ball. Using this global assignment, the user then further assigning within the group until they eventually are down to a one-on-one mapping or to a level where the designer is comfortable with auto-assign algorithms taking over. Assignment is done in an efficient manner while preserving hierarchical grouping.

In one embodiment, the present disclosure provides a method for using a PCB block diagram tool for block diagram level editing of a PCB design abstracted from a PCB physical layout tool. A number of interface objects represent interfaces between domains. Each of the number of interface objects include a number of signal, power and ground signal lines without defined physical assignment to pin or pad. A number of component objects represent a number of physical objects. An indication is received of which of the number of interface objects should be associated with the number of blocks. The number of interface objects are assigned to the number of blocks. An indication of how interconnect lines connect the number of interface objects with the number of component objects is received. Interconnect lines are assigned.

In another embodiment, the present disclosure provides a method for manipulating signal, power and/or ground lines as a group with a PCB physical layout tool. A number of groups that correspond to a number of signal, power and/and ground lines is stored. The number of groups are assigned to a number of physical objects. The group is selected from the number of groups, where the group is associated with one of the number of physical objects. The group is reassigned to different pins of the one of the number of physical objects upon indication by a user to move the group. The group is accentuated on the package object by the display module.

In yet another embodiment, the present disclosure provides a method for manipulating interface objects for a PCB tool. The number of groups are associated with the number of signal, power and ground lines without defining pin or pad assignments. Association between the number of interface objects and a number of groups is received. The number of interface objects; the number of groups; the number of signal, power and ground lines; and associations between these three are stored. An interrelation between a number of interface objects and a number of groups each including a number of signal, power and ground lines, is stored. The number of interface objects are configured to be associated with a number of block objects to define a number of component objects.

In an embodiment, a printed circuit board (PCB) block diagram tool for block diagram level editing of a PCB design abstracted from a PCB physical layout tool is disclosed. The PCB block diagram tool includes a plurality of interface objects, a plurality of block objects and interconnect lines. The plurality of interface objects represents interfaces between components. Each of the plurality of interface objects include a plurality of signal, power and ground signal lines without defined physical assignment to pin or pad. The plurality of block objects represents a plurality of physical objects in the PCB physical layout tool. The plurality of blocks are configured to accept the plurality of interface objects. Interconnect lines connect the plurality of interface objects between the plurality of block objects.

In another embodiment, a method for using a PCB block diagram tool for block diagram level editing of a PCB design abstracted from a PCB physical layout tool is disclosed. In one step, a plurality of interface objects representing interfaces between components is provided. Each of the plurality of interface objects include a plurality of signal, power and ground signal lines without defined physical assignment to pin or pad. A plurality of block objects representing a plurality of physical objects is provided. An indication of which of the plurality of interface objects should be associated with the plurality of blocks is received. The plurality of interface objects is assigned to the plurality of blocks. An indication of how interconnect lines connect the plurality of interface objects with the plurality of block objects is received. The interconnect lines are assigned.

In yet another embodiment, a machine-readable storage medium comprising executable instructions for a PCB block diagram tool that provides block diagram level editing of a PCB design abstracted from a PCB physical layout tool is disclosed. Code for receiving indication of which of a plurality of interface objects should be associated with a plurality of blocks. The plurality of interface objects represent interfaces between components. Each of the plurality of interface objects include a plurality of signal, power and ground signal lines without defined physical assignment to pin or pad. The plurality of block objects represent a plurality of physical objects. Code for assigning the plurality of interface objects to the plurality of blocks. Code for receiving indication of how interconnect lines connect the plurality of interface objects with the plurality of block objects. Code for assigning interconnect lines.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

Figure 1:
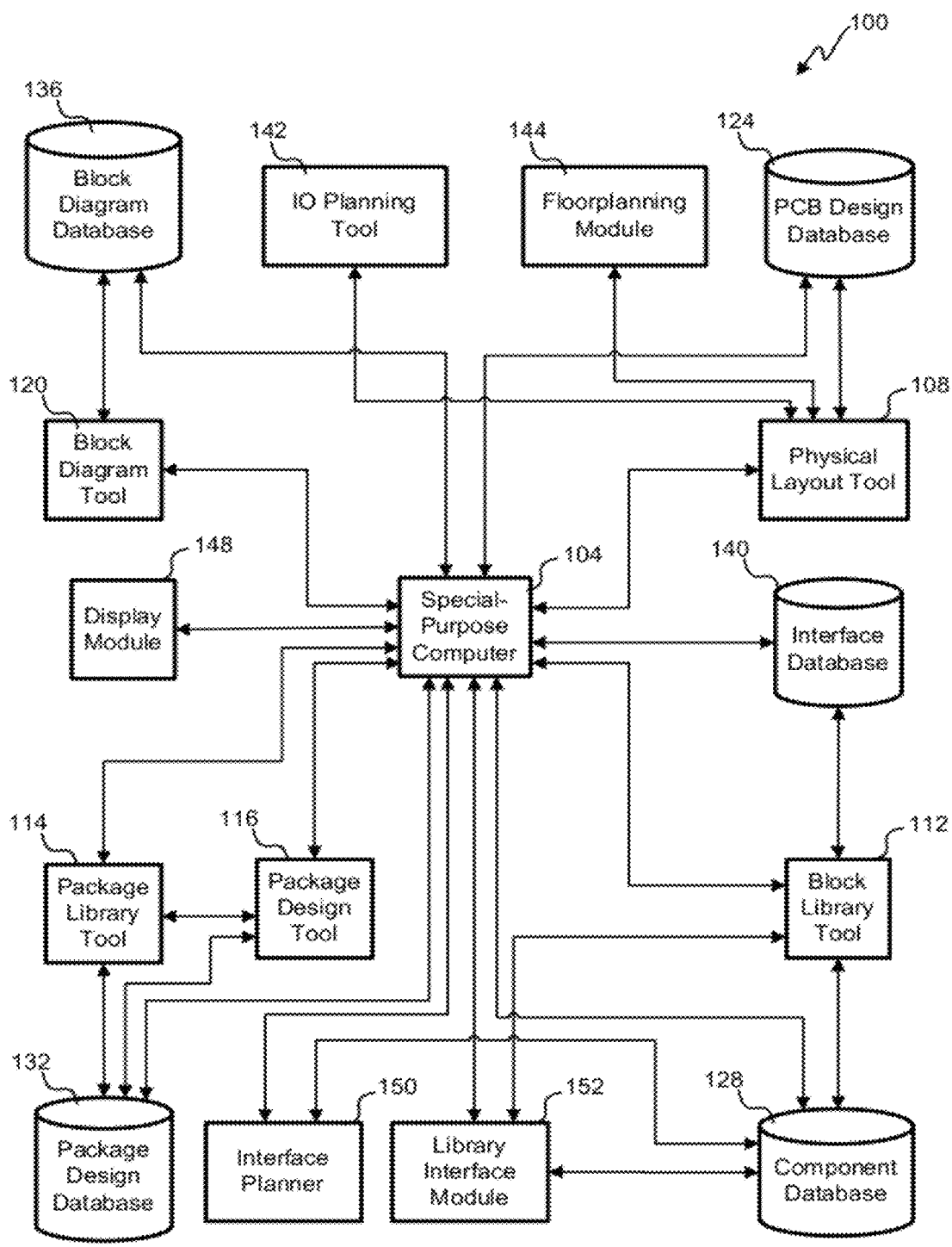
FIG. 1 depicts a block diagram of an embodiment of a block diagram of an embodiment of a PCB design tool.

Referring first to FIG. 1, a block diagram of an embodiment of a PCB design tool 100 is shown. A number of modules, tools and databases all operate on a special-purpose computer system 104 to allow design and edit of PCBs and component objects for components that will be in the assembled circuit card. Other embodiments could use a number of special-purpose computers and servers in one location or spread across a network or the Internet. Designers could be in the same location or spread out in a number of locations working on a design.

Generally PCB design tools work with virtual representations of actual PCBs, chip packages, multi-chip modules, connectors, passive and active devices, and other items that are part of a system that includes PCBs. Throughout the specification a terminology is used to refer to various virtual representations or objects. Physical objects have dimensioning and pin placement and configuration and may resemble the actual part used in the product. The parts that are added to a PCB are called component objects in the PCB design tool 100. Component objects include several varieties including connector objects and package objects, where connector objects are used for interconnection without any circuitry and package objects generally include some sort of circuit element.

Component objects may ultimately be linked to a physical object, but need not be in domains of the design. Component objects functionally define interfaces. Some embodiments could use hardware description language instantiated to further define how the component object might operate for design and simulation purposes. Component objects are designed by placement of a block object and adding signal and interface objects onto the block object. The interface object includes a group and possibly sub-groups of signals. In higher-level domains of the design, the signals in an interface object are not necessarily tied to pins of a physical object.

Entry of the design is typically begun on the block diagram tool 120, which allows circuit card layout abstracted from a PCB physical layout tool 108. A block library tool 112 is used to access existing library component objects and design new component objects. When defining new component objects, the block library tool 112 is used along with a library interface module to associate interface objects and signal objects with a block object. The block library tool 112 could be used to map interfaces to legacy library component objects that are not interface aware. A package design tool 116 is used to design physical objects and their pins or pad configuration for various package and connector objects. The block diagram tool 120, PCB physical layout tool 108, and package design tool 116 all work in a common platform through different domains that exchange data and information to collectively assist in design of a circuit card.

A display module 148 is used within the PCB design tool 100 for designers to interface with the various tools in their various domains. The display module may have separate interfaces, windowed interfaces, command line interfaces, etc. to accomplish the interaction. The PCB design tool 100 is cohesive such that while in one tool, editing could be performed with overlying windows or portals to other component tools 112, 116, 120, 108. For example, a interface planner 150 can show in an overlay window the interface objects available for selection or highlighting in the PCB physical layout tool 108. Editing of the signal names or grouping in that overlay window would be stored in the appropriate location and disseminated to the other component tools 112, 116, 120, 108, 144 and their domains.

The block library tool 112 is available to the block diagram tool 120 to provide block objects and interface objects when designing new component objects. Some component objects can be predesigned for common components or can be designed using the block library tool 112. The PCB physical layout tool 108 also uses the block library tool 112. The component objects are mapped to physical objects used in the PCB physical layout tool 108. In the block diagram tool 120 domain, there need not be assignment of any signals to actual pins, but in the PCB physical design tool 108 there is mapping to the actual pins before allowing routing of the circuit card.

A component database 128 is coupled to the block library tool 112 and the remainder of the PCB design tool 100. Interface objects, block objects and component objects are stored in the component database 128. The component objects include connector objects and package objects that are virtual representations of physical packages and connectors. Component objects represent the physical packages and connectors at a higher level of abstraction with interface objects and signals so you do not see individual pin numbers, instead you see interface pins. In the component database 128, the component objects are mapped to physical objects, which have 3D dimensioning and pin locations. The component objects and their corresponding physical objects that have been assigned the interface objects are also stored in the component database 128. Table I shows an example of how component objects are mapped to physical objects along with the interface objects assigned. The physical objects have physical dimensioning of the real world packages and pins to allow the PCB physical layout tool 108 to perform physical board layout.

TABLE I

Component Object to Physical Object Mapping

| Component Object | Physical Object | Interface Object(s) |
|---|---|---|
| J4 CONNECTOR | 10 pin DIN | USB |
| USB_LAN | 20 pin BGA | 500 MBit, USB |
| J1 EDGE-CONNECTOR | 180 pin card edge | 500 MBit, DDR2, PCI-X |
| BGA300 | 300 pin BGA | 500 MBit, DDR2, GND, VCC, PCI-X |
| U1 MEM_1 GB, U2 MEM_1 GB | 40 pin SOIC | DDR2, GND, VCC |

In an interface database 140, interface objects are stored with interface names, signal grouping (sub-grouping, sub-sub-grouping, etc.), signal names, and any pin assignment or routing rules. An interface object can be defined without assignment to any block object or component object, and made available for later possible assignment in the interface planner 150 when instantiated into the design. Table II provides an example of what would be two component objects and is an amalgamation of information from the interface database 140 and the component database 128. At some point, the actual pin assignments for each signal assigned to a component object are stored in the component database 128, but that level of detail is not required in while operating with component objects in the domain of the block diagram tool 120. The two example interface objects (i.e., USB and 500 MBit) are mapped between two component objects (i.e., J4 and USB_LAN), but would not be mapped for those interface objects not currently used in the interface database 140.

TABLE II

Component Object Example

| Component Object | Interface(s) | Group(s) | Sub-Group(s) | Signal(s) | Pin Assignment/Routing Rule(s) |
|---|---|---|---|---|---|
| CONNECTOR | USB | Signals | | Tx-High | Adjacent to Tx-Low |
| | | | | Tx-Low | Adjacent to Tx-High |
| | | Power | | Vdd | Two pins adjacent to Signals Group |
| | | | | GND | Two pins adjacent to Signals Group |
| USB_LAN | 500 MBit | Signals | Chan_1 | TrA-Hi | Adjacent to TrA-Lo & Isolate from Chan_2 |
| | | | | TrA-Lo | Adjacent to TrA-Hi & Isolate from Chan_2 |
| | | | Chan_2 | TrB-Hi | Adjacent to TrB-Lo & Isolate from Chan_1 |
| | | | | TrB-Lo | Adjacent to TrB-Hi & Isolate from Chan_1 |
| | | Power | | Vdd | Two pins adjacent to Signals Group |
| | | | | GND | Two pins adjacent to Signals Group |
| | USB | Signals | | Tx-High | Adjacent to Tx-Low |
| | | | | Tx-Low | Adjacent to Tx-High |
| | | Power | | Vdd | Two pins adjacent to Signals Group |
| | | | | GND | Two pins adjacent to Signals Group |

The interface objects are designed with grouping, sub-grouping, sub-sub-grouping, etc. in a hierarchical fashion. The arrangement of groups is stored in the interface database 140. The embodiment in Table II shows two levels of hierarchy, but there could be any number of levels in the hierarchy in various embodiments. The various levels of the hierarchy with interface groups of pins are displayed by a library interface module 152 and an interface planner 150. Editing of grouping of pins can be done with the interface planner 150 in the block library tool 112 or while in other tools 120, 124, 116. Groups can be copied from other interface objects to create new interface objects. Groups can be moved to different levels in the hierarchy.

Various physical objects are placed in a package design database 132 to represent package and connector objects physically with dimensioning and pin configurations. The package library tool 114 is used to access pre-existing physical objects. In the physical layout tool 108, physical objects are used. By mapping a physical object to a component object, the interface and signal objects are generally assigned to the physical object. Where the physical object has pre-assigned pins, those pins are defined for the physical object when the component object is assigned.

The package design tool 116 is used to design physical objects that are custom packages and connectors or were not included in the default library or previously designed. Being integrated with the PCB design tool 100, the package design tool 116 allows co-design where the signals and their grouping is passed between the block diagram tool, PCB physical layout tool, and block library tool seamlessly. Changes made in any of the design tools 112, 116, 120, 108 are propagated through out the environment of the PCB design tool 100 cohesively. For example, a physical object name could be changed in the package design tool 116 and be updated in the various databases 124, 128, 132, 136, 140 automatically. Designers working in different locations have their portion of the design updated as changes are made anywhere in the PCB design tool 100 when synchronization is initiated by a designer.

A package design database 132 stores the physical objects that were in the default library or later added. Physical objects in the package design database 132 are accessible through the package library tool 114. While the designer is working with the package design tool 116 the changes are stored in the package design database 132. The component objects are mapped from the physical object to the package and connector objects in the component database 128. Physical dimensioning of the physical object, pin locations and other parameters are stored in the package design database 132. Some of the additional parameters could be heat profiles, board placement considerations and other rules. The information in the package design database 132 is available to other portions of the PCB design tool 100 to assist in layout and routing of signals.

The block diagram tool 120 is used to typically do the initial block-diagram level planning of the circuit card. Component objects are chosen from the component database 128 that are predesigned. For component objects not available in the component database 128 already, the block library tool 112 can be interfaced to or invoked to design a new component object. Component objects are created directly from within the block diagram tool 120. The library interface module 152 is used to access interface and signal objects that used to build the complete interface for the block object on the fly. Interface objects can be pulled from the interface database 140 to build a block object. Interconnection lines and busses can be added between the various component objects. The block diagram tool can indicate mismatches when interconnection is attempted between interface objects that do not have signals that map. The chosen block objects, interface objects, interconnections, and their placement are stored in the block diagram database 136.

The PCB physical layout tool 108 can receive from the block diagram database 136 a netlist that contains the interface information and any mapping of physical signals to begin the physical circuit card design. Changes made in the PCB physical layout tool 108 can be passed back to the block diagram tool 120 and vice versa through a synchronization process initiated by the user. Any component objects that are not assigned to physical objects can be done at this stage if not done already to form a component object that is usable in the domain of the PCB physical layout tool 108. Grouping of the signals in the interface objects is preserved. Initial assignment of groups and signals to pins is performed for a design. A designer in the package design tool 116 domain can interact with the initial placement or final placement when designing the physical object.

A input/output (I/O) planning tool 142 can perform the initial assignment of groups and pins within those groups After the components are initially placed on model of the physical circuit card by the floorplanning module 144. Signal nets can be initially represented in the design without routing. Once the component objects are placed, the pins defined, additional signals are added, and other physical editing of the circuit card design are performed, the I/O planning tool 142 can do assignment of signals to pins, before routing of traces and other physical manipulations of trace placement is performed in an automated manner. Any rules for pin placement, component placement and routing can be used to perform automatic pin placement processing by the I/O planning tool 142. Where manual changes are made by the designer in the I/O planning tool 142, those same rules can be used to check for errors.

Once initial placement of the components in the floorplanning module 144, signals and groups of signals with the I/O planning tool 142, the designer can manually manipulate components, signals and groups of signals. Signals and groups of signals are identified with coloring through manipulation of the interface planner 150. Different groups can be accentuated in various levels of hierarchy. The IO planning tool 142 allows dragging groups and signals to pins. When a group of signals is dragged to different pins, placement rules can be automatically applied to arrange signals, power, ground, etc. within the group.

A PCB design database 124 holds the physical placement of the component objects, circuit card dimensioning, trace routing, etc. in whatever state of completion. Any mismatch between signals can be resolved. The changes made are propagated to throughout the environment of the PCB design tool 100. Although several databases are shown in the PCB design tool 100 and discussed separately, it is to be understood that these could be combined or split in any manner. Instead of databases, file structures could be used for some or all of the design.

Figure 2:
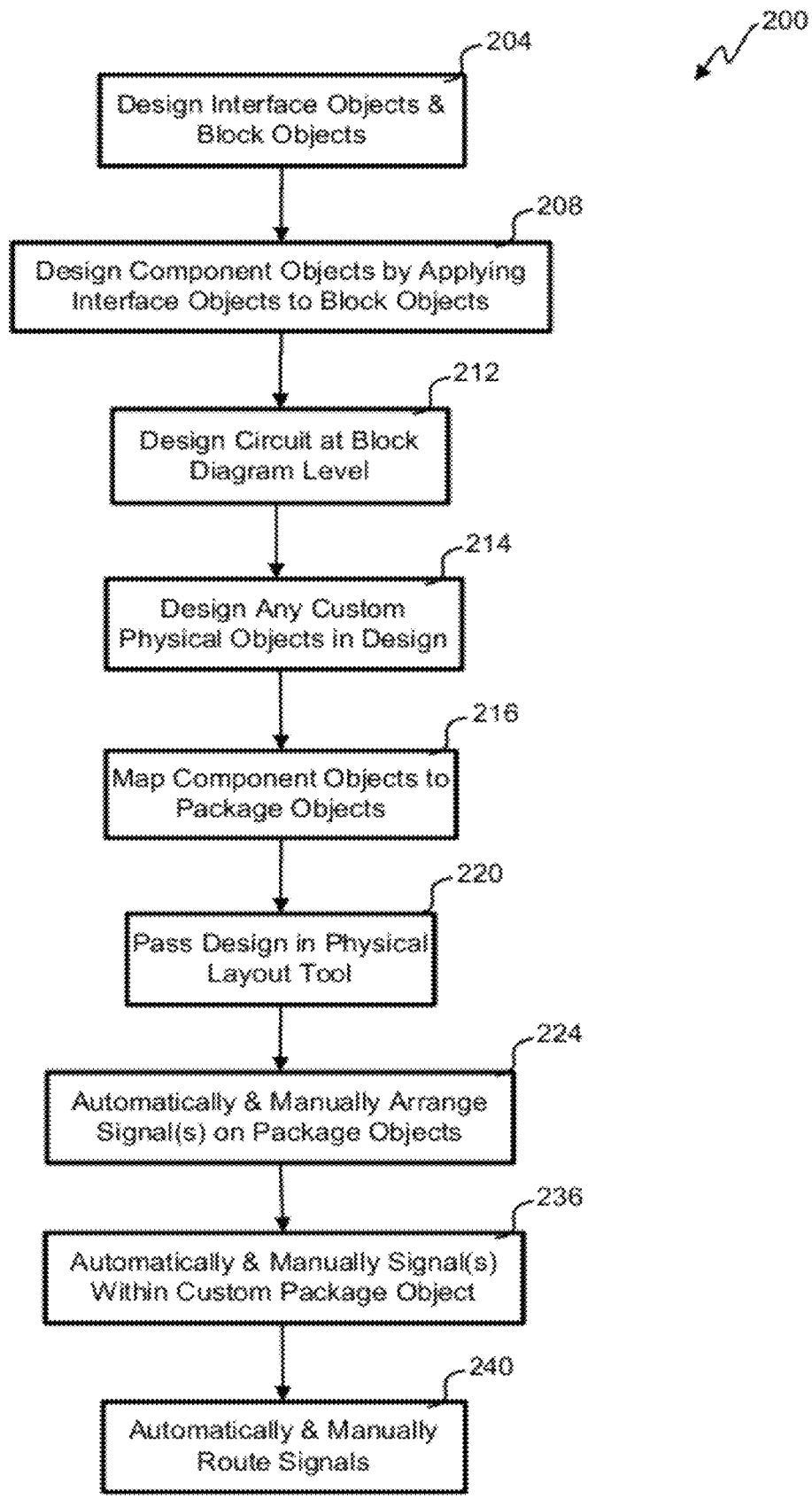
FIG. 2 illustrates a flowchart of an embodiment of a workflow that uses the PCB design tool.

With reference to FIG. 2, an embodiment of a design workflow 200 is shown that uses the PCB design tool 100. The process typically starts architecting the system at a high-level abstracted from the physical constraints with the block diagram tool 120. Any missing interface or block objects are designed in block 204 with the interface planner 150 such that they are available for building component objects. Any missing component objects not already in the component database 128, are assembled in block 208. Creation of a component object involves laying down interface and signal objects onto a block object.

In block 212, the circuit is designed at a high-level by interconnecting signal and interface objects between the various component objects. With this approach, all the signals can be easily defined and passed to the other tools 112, 116, 120, 124 of the PCB design tool 100. Where a physical object for a package or connector object is not in the package design database 132, a physical object can be designed using the package design tool 116 in block 214. The component objects are mapped to physical objects in block 216 to bind a component object to a specific physical footprint. When a physical object bound to the component object, the actual pin assignments would be visible at this stage with the interface planner 150, but that is not necessary at the level of abstraction in the domain of the block diagram tool 120. For physical objects without defined pin assignments, the pins are assigned to signals later in the design workflow 200.

In block 220, the design is passed to the domain physical layout tool 108. The dimensions of the circuit card can be entered, areas blocked off and other preliminary operations. After floorplanning to place components, the groups of signals and individual signals can be manually and/or automatically moved to different pins on physical objects with the rules for pin arrangement enforced using the IO planning tool 142. Any automatic arrangement of component objects is performed by the floorplanning module 144, and automatic arrangement of groups of signals or individual signals is performed by the I/O planning tool 142. If there is a co-design package object, signal arrangements in the PCB physical layout tool 108 can be coordinated with the package design tool 116. In block 236, the signal assignments can be manually and/or automatically with the aid of the interface planner 150. Once all the physical objects are placed and the signals are tied to pins, the interconnections can be automatically and/or manually routed in block 240. Often routing is a combination of automatic and manual iterations.

Figure 3:
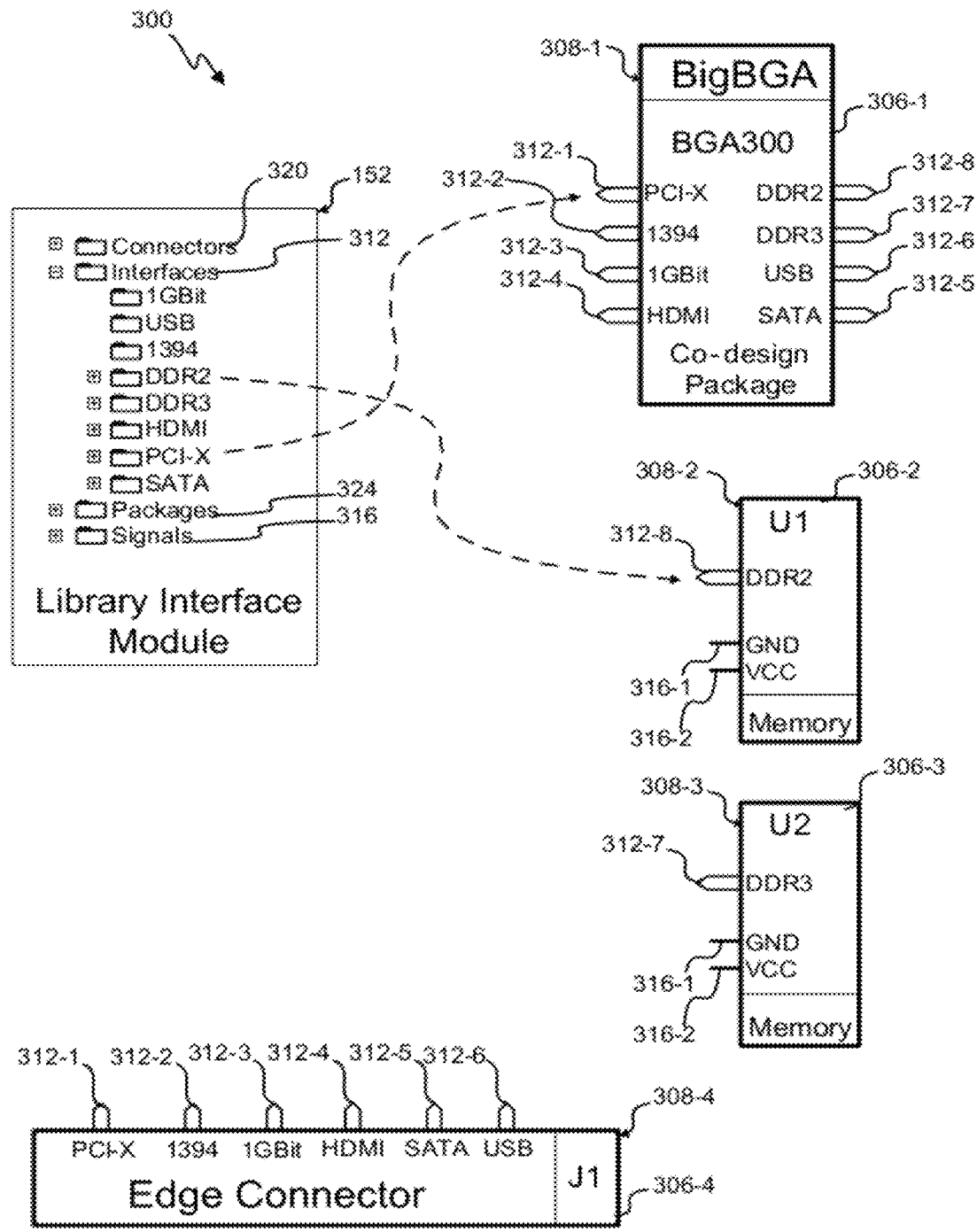
FIG. 3 depicts a block diagram of an embodiment of a schematic illustrating component creation.

With reference to FIG. 3, an embodiment of a block diagram 300 using a library interface module 152 is shown. The library interface module 152 has connector objects 320, interface objects 312, signal objects 316, and package objects 324 that can be used to formulate or retrieve component objects 308. A component object 308 is defined with a block object 306 and interface objects 312 and signal objects 316. Using the library interface module 152, a block diagram depiction of the circuit can be quickly created at a higher level of abstraction than would be required if each signal for each pin were defined as well as each package for each component. In this example, there are four component objects 308 (i.e., Big-BGA, U1, U2, J1) that were already created using the library interface module 152 or drawn using the block library tool 112 if pre-existing in the component database 128.

To create a component object 308, a block object 306 is drawn and labeled. Various signal and interface objects are dragged from the library interface module 152 for placement on the block object 306 to assign signals and groups of signals. The dashed arrows show how interface objects 312 are dragged from the hierarchical display module 152 to block objects 306 to form the component objects 308. Each interface object 312 includes a group of signal objects 316 or sub-groups of signal objects arranged hierarchically such that any group, sub-group, sub-sub-group, etc. can be easily dragged onto a block object 306.

The library interface module 152 can also be used to place pre-configured component objects 308, for example, connector and package objects 320, 324. These are also arranged hierarchically such that a multi-chip module or circuit card could have a number of smaller components that could be selected individually for placement into the block diagram. Those component objects 308 that are designed in the block diagram tool 120 can be loaded into the block library tool 112 such that they would appear in the library interface module 152 for placement in other block diagrams.

Existing component objects 308 are accessible through a block library tool 112 (not shown). These component objects 308 can be placed into the block diagram and further edited by adding/removing signal and interface objects. In some cases, the existing component objects 308 maybe legacy component objects 308 without assignment of signal objects, which can be done with the library interface module.

Figure 4:
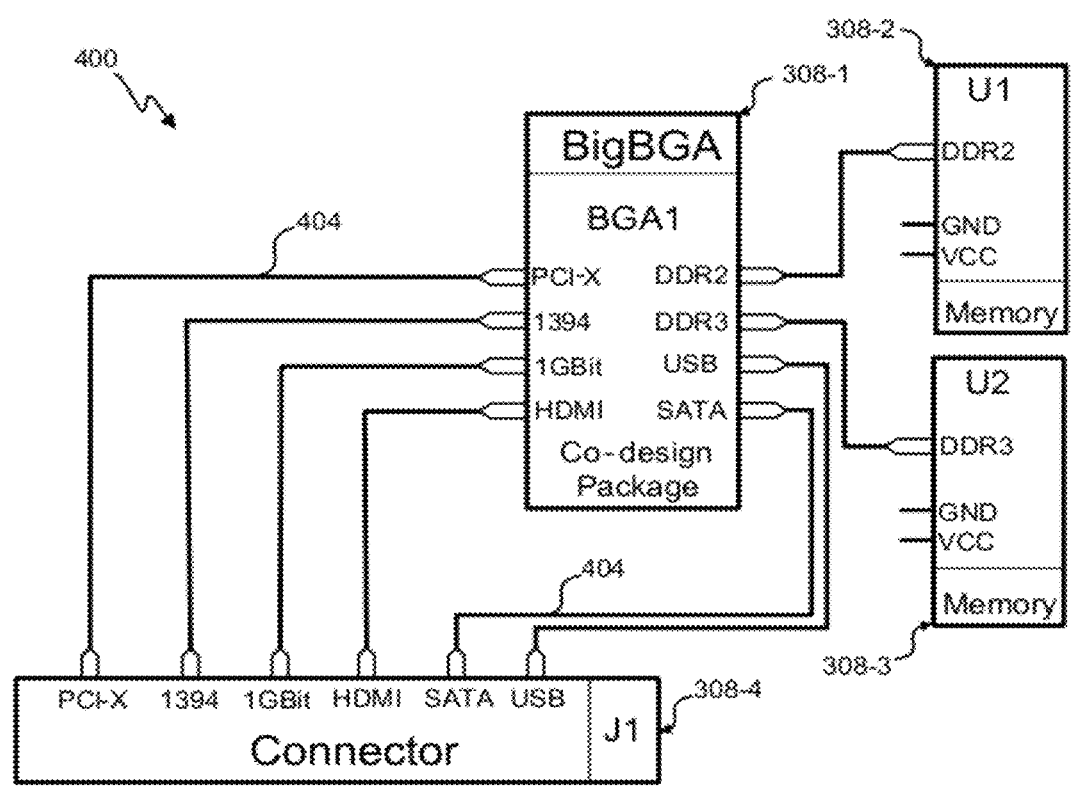
FIG. 4 depicts a block diagram of an embodiment of the schematic.

Referring next to FIG. 4, an embodiment of the block diagram 400 is shown. The four component objects 308 are arranged and interconnections 404 are made between interface objects 312 and signal objects 316. There can be checking that confirms both ends of an interconnection 404 reach a component object at matching interface or signal objects. Where that is not the case, a hover menu or other error is displayed. The block diagram 400 can be quickly created and is abstracted from the physical layout and pin assignment.

Figure 5:
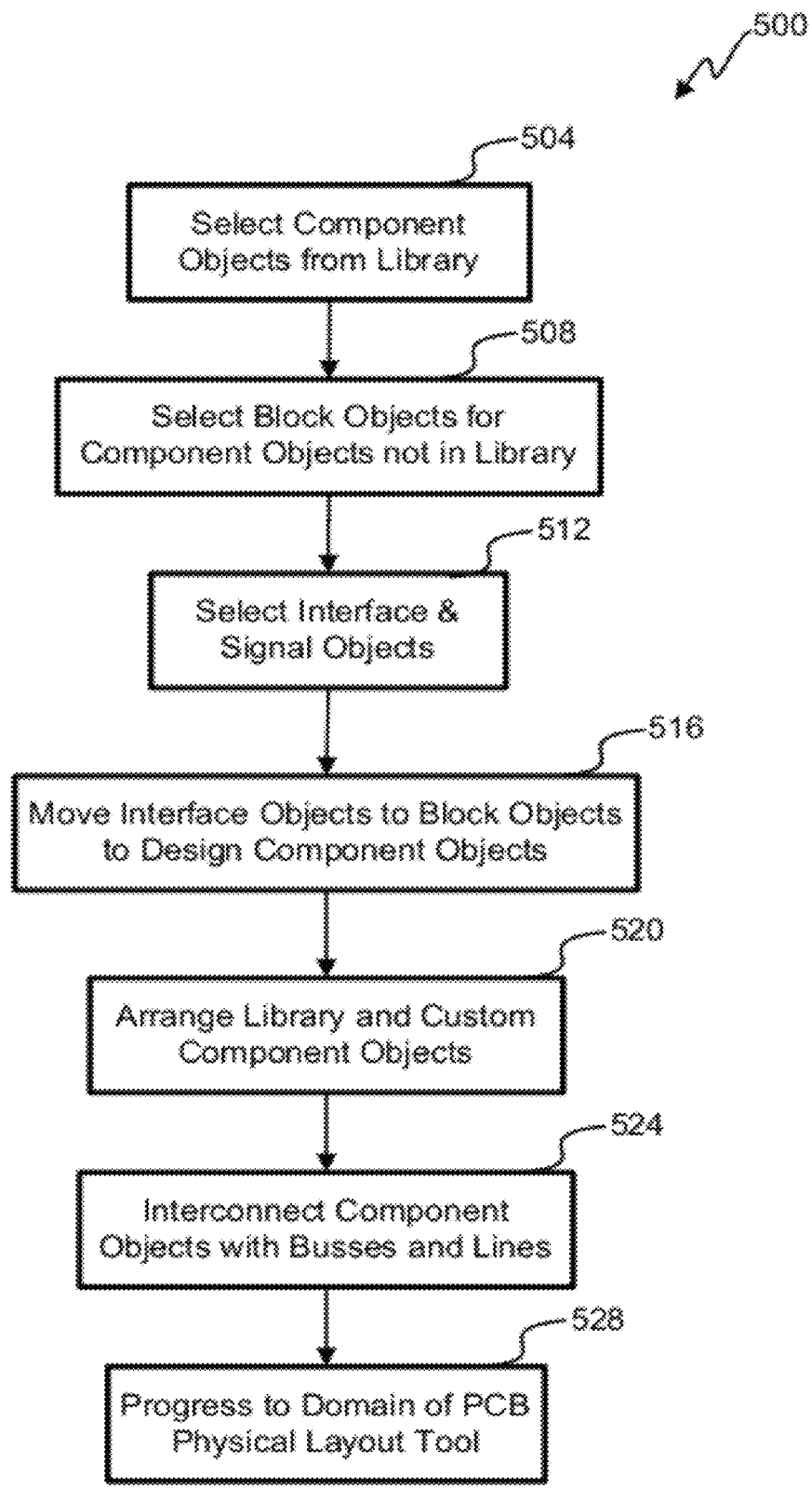
FIG. 5 illustrates a flowchart of an embodiment of a process for interacting with the block diagram tool.

With reference to FIG. 5, an embodiment of a process 500 for interacting with the block diagram tool 120 is shown. When starting a new design, typically the process begins with block-diagram level drawings. In block 504, the component objects 308 available from the library already are placed in the schematic. In block 512, those not found through the block library tool 112 are created by combining block objects 306 found in block 508 with signal and interface objects 316, 312 found in block 512 and placed on the block objects 306. Once all the components are on the schematic, they are arranged in block 520.

The signal and interface objects 316, 312 are connected in block 524. Some could be left unconnected for connection in the PCB physical layout tool 108 or left unconnected if that is how the circuit card is designed. In block 528, the block diagram level of the design is complete and the workflow progresses to the PCB physical layout tool component for further work. At some point, the component objects 308 are mapped or linked to physical objects for use in the domain of the PCB physical layout tool 108.

Figure 6:
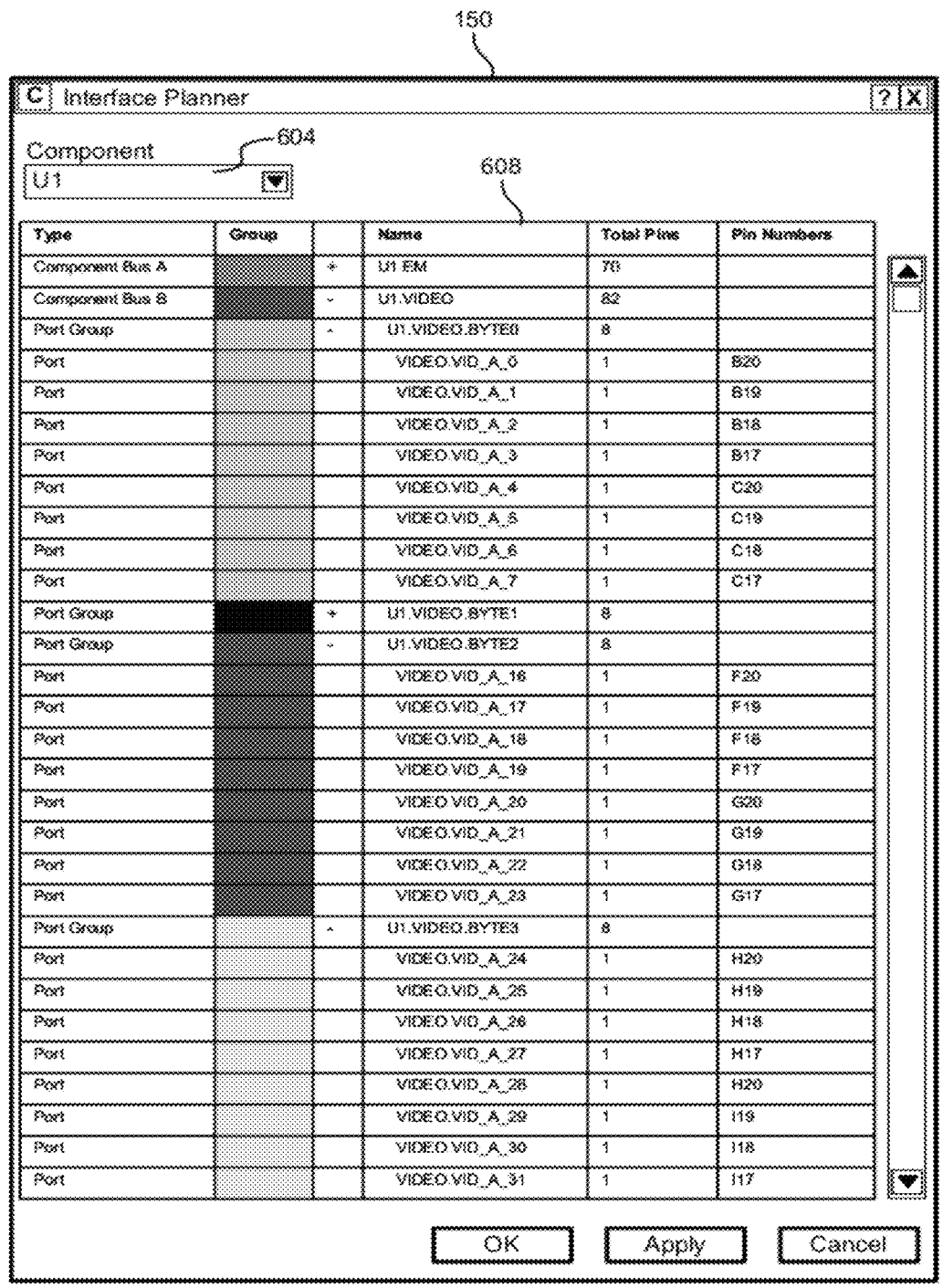
FIG. 6 illustrates a screen shot of an embodiment of an interface planning tool for interacting with pin-level information for connectors and packages.

Referring next to FIG. 6, a screen shot of an embodiment of an interface planning tool 150 is shown that allows interacting with pin-level information for connector and package components. Once a component object 308 is bound to a physical object such as a package or connector, pins assignments for the interface and signal objects 312, 316 are assigned and manipulated. In the interface planner 150 example depicted, a U1 component object is bound to a pin grid array physical object. Interface objects 312 are hierarchically arranged in the Component Bus A and B groups. By clicking a plus symbol for a group row, the lower level(s) of the hierarchy is displayed.

The details for the Component Bus B group are displayed to show various port groups and their included ports or signals. The pin number for each signal name is shown and can be manually edited using the interface planner 150. Additional component objects 308 can be selected with in the component pulldown field 604 such that their groups and signals would populate the table 608. Where a physical object is unassigned for a component object 308, the pin number column would be blank.

In the interface planner 150, the groups are color coded differently in the group column. The selected colors are carried forward to the package design tool 116 and IO planning tool 142. Groups or signals can be selected in the interface planner 150 and they are highlighted in other tools. Dragging a group or signal to different pins in the IO planning tool 142 or package design tool 116 assigns the group or signal to another set of pins. The new assignment of pins is reflected in the interface planner 150.

Figure 7:
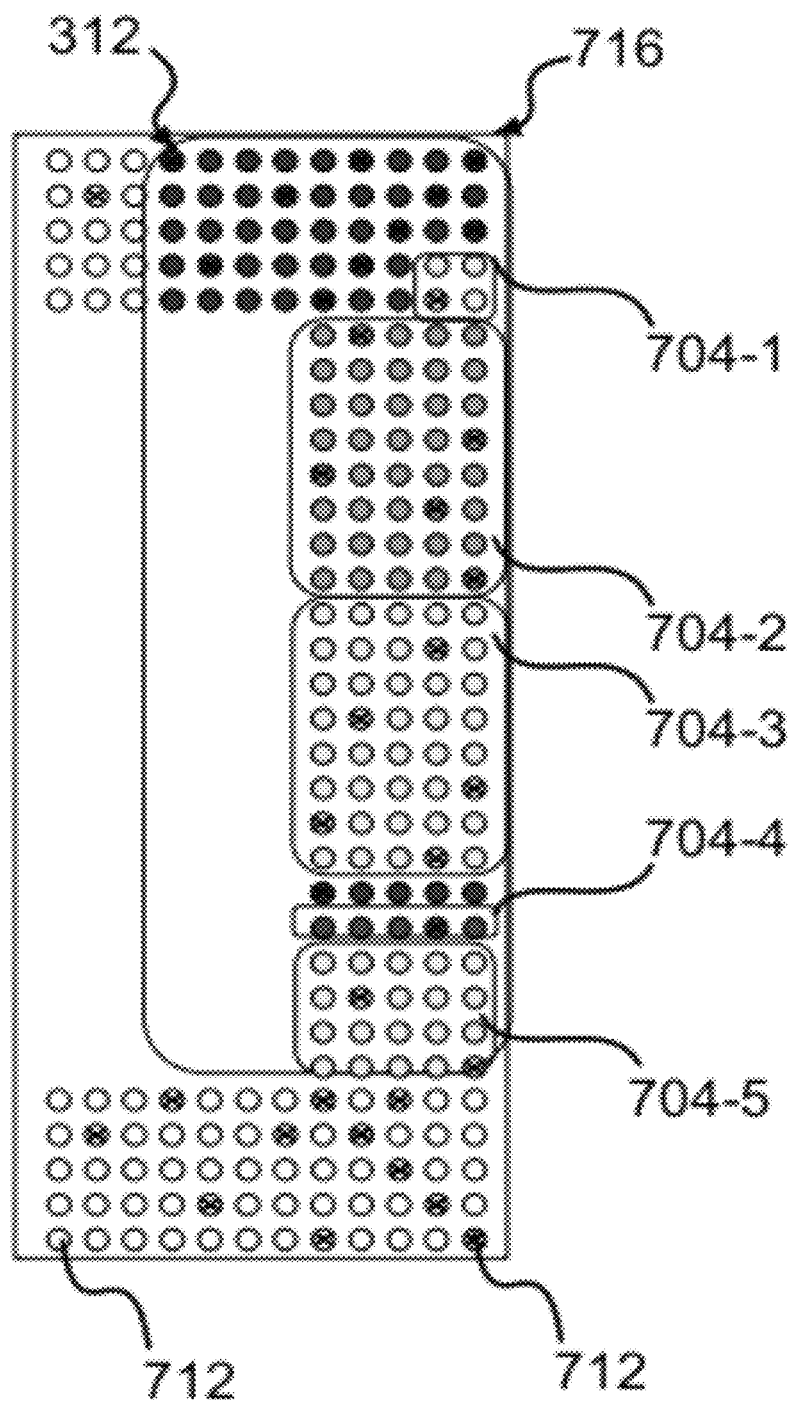
FIG. 7 depicts a diagram of an embodiment of a portion of a package object and a hierarchical display module with groups mapped to pins.

With reference to FIG. 7, an embodiment of a left portion of a package object 716 is shown with signal groups 704 mapped to pins 712. In the interface planner 150 an PCIe interface object 312 can be selected, with sub-groups 704 within the PCIe interface object 312 for JTAG 704-5, SMBus 704-4, Port0 704-2, Port1 704-3, and hot plug detect 704-1 shown with the corresponding color coding. As the hierarchy is expanded or contracted in the interface planner 150 by activation of the plus or minus control, different interface objects 312 and sub-groups 704 within the circuitry are accentuated with a color, highlight and/or encircling.

In this embodiment, some of the interface objects 312 can be selected and highlighted with the interface planner 150. There are signal pins that are not part of any sub-group 704, but still part for the PCIe interface object 312 and are encircled without any designation of any sub-group. The accentuated interface object(s) 312 and group(s) 704 in both the interface planner 150 and on the package object 716 can have different colors for each sub-group 704 to further enhance identification.

Figure 8C:
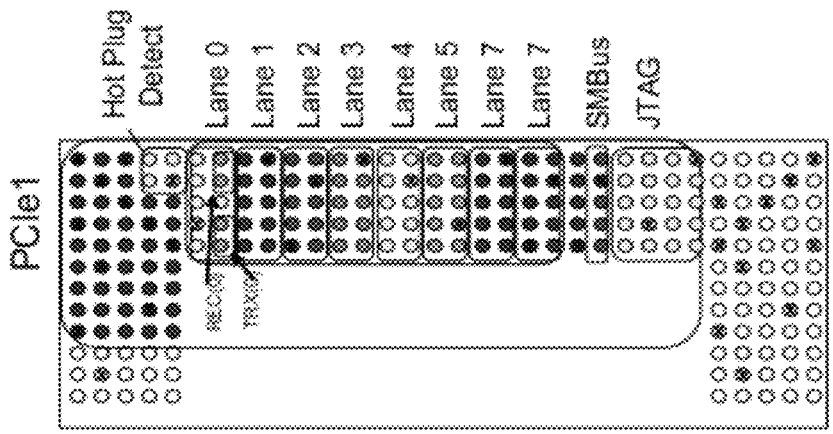
FIGS. 8A, 8B and 8C depict diagrams of an embodiment of a portion of a package object shown in various stages of group selection.
Figure 8B:
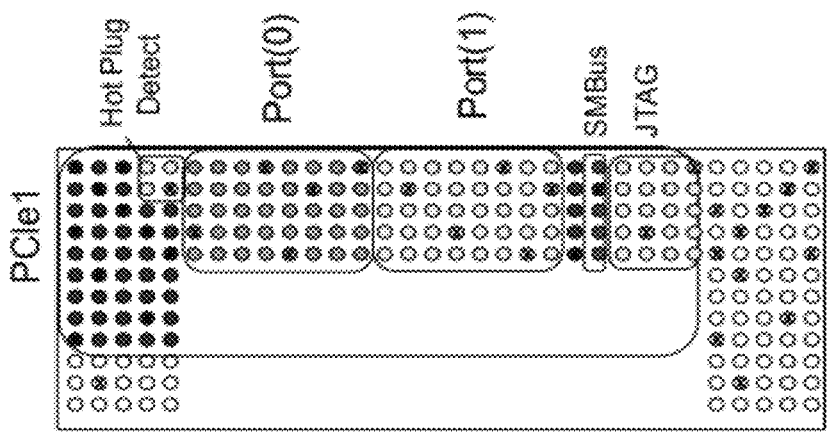
Figure 8A:
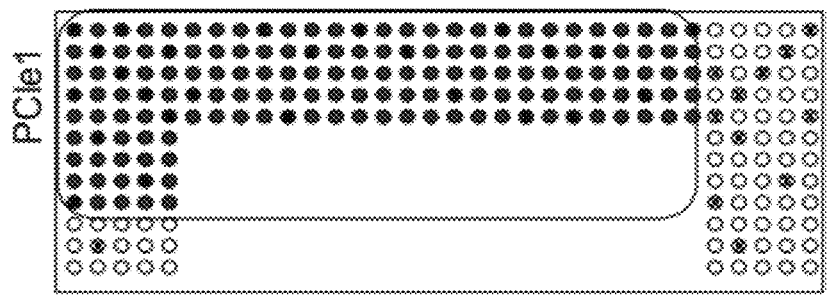

Referring next to FIGS. 8A, 8B and 8C, an embodiment of a process of selecting signals at three levels in the hierarchy is shown. In FIG. 8A, the PCIe1 group 704 is selected. The sub-groups 704 are shown in FIG. 8B and the sub-sub-groups 704 are shown in FIG. 8C. By accentuating the groups 704 in the hierarchical display module 152, the different levels of detail are accentuated on the component object 716. The hierarchies can be unfurled a level at a time by clicking on the plus symbol next to any level in the interface planning tool 150.

Figure 9:
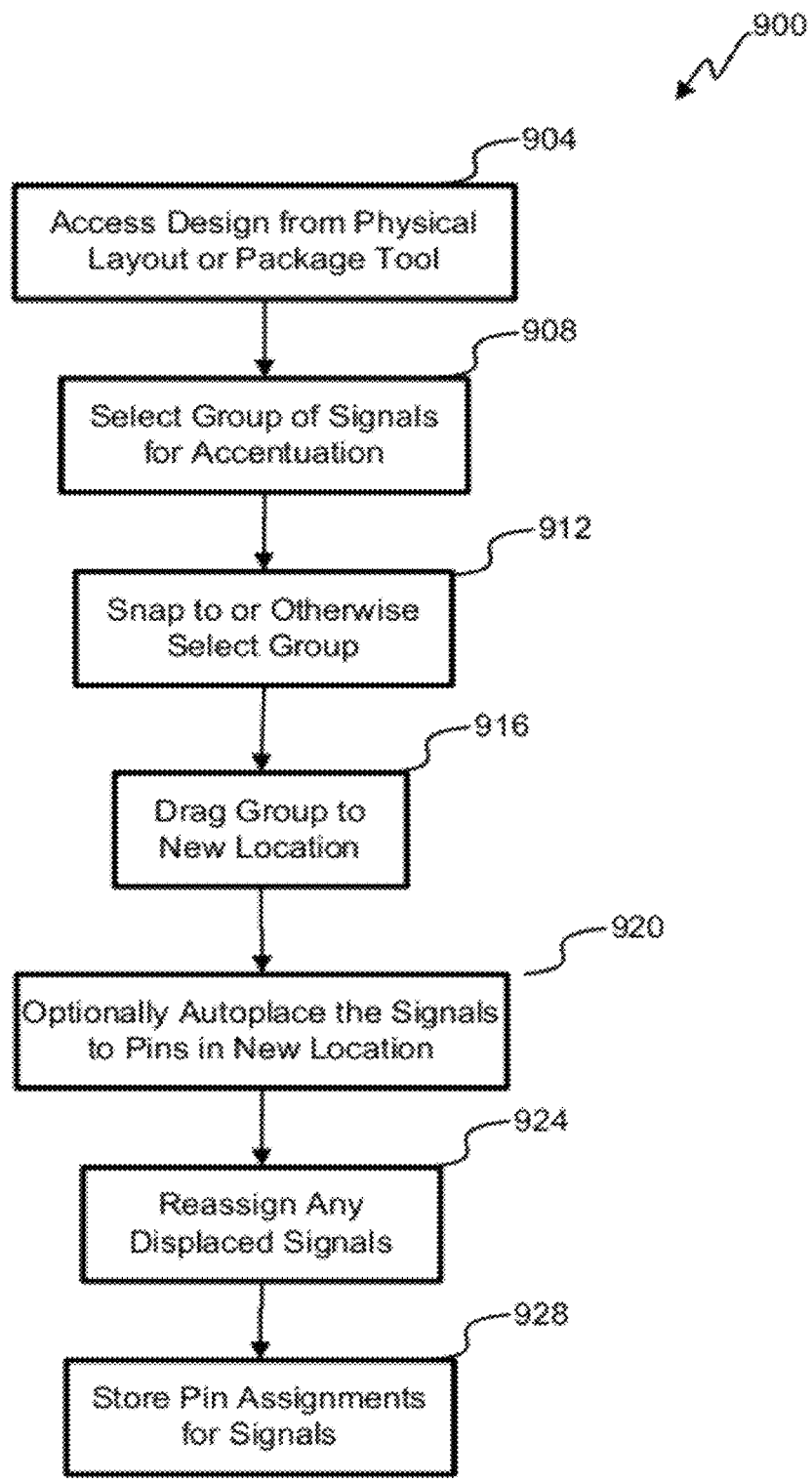
FIG. 9 illustrates a flowchart of an embodiment of a process for interacting with the physical layout or package design tools.

With reference to FIG. 9, an embodiment of a process 900 for interacting with the physical layout or package design tools 108, 116 is shown that moves groups 704 of signals to various pin assignments. The depicted portion of the process 900 begins in block 904 where the design is accessed from the domain of either the physical layout or package design tools 108, 116. Either of these environments allow moving of groups 704 between pins. In block 908, a group 704 of signals is selected for accentuation using the hierarchical display module 152 or another mechanism. With the cursor or other selection means, one or more groups 704 are chosen in block 912. The group(s) 704 are dragged to a new location in block 916.

When the new location is chosen, the signals can be auto-assigned to pins using the I/O planning tool 142 in block 920. Auto-assignment can be disabled or overridden. Any assigned signals that were displaced by the movement, can be auto-assigned or manually placed from an unassigned state in block 924. The pin assignments are stored in block 928.

Figure 10A:
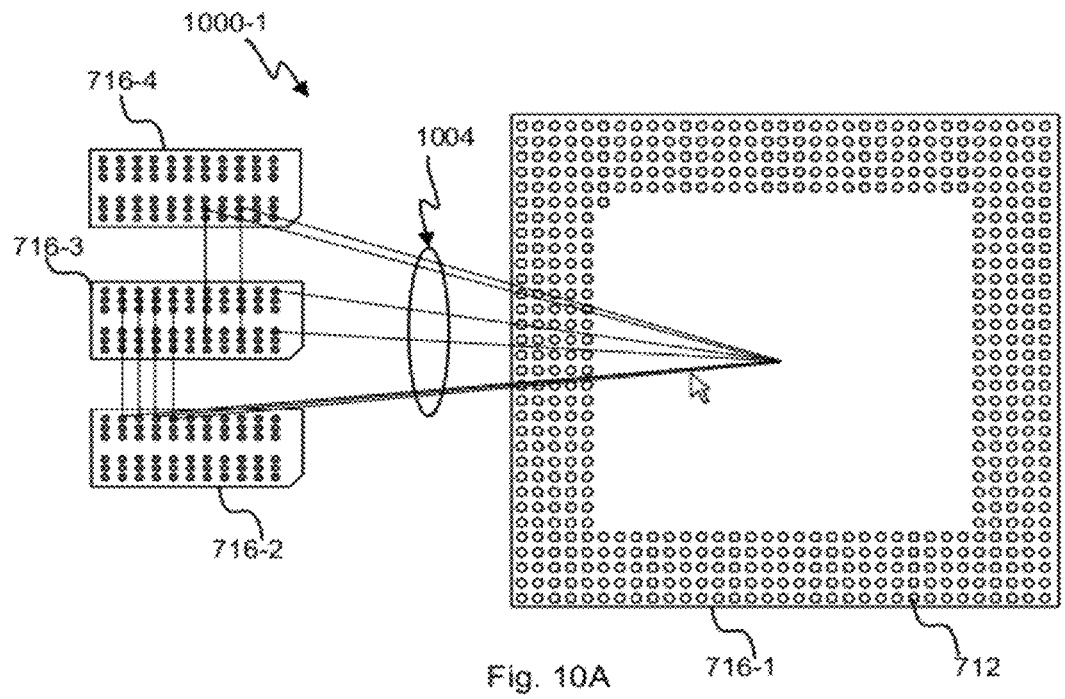
FIGS. 10A and 10B depict block diagrams of an embodiment of package objects before and after assignment of a group of pins.
Figure 10B:
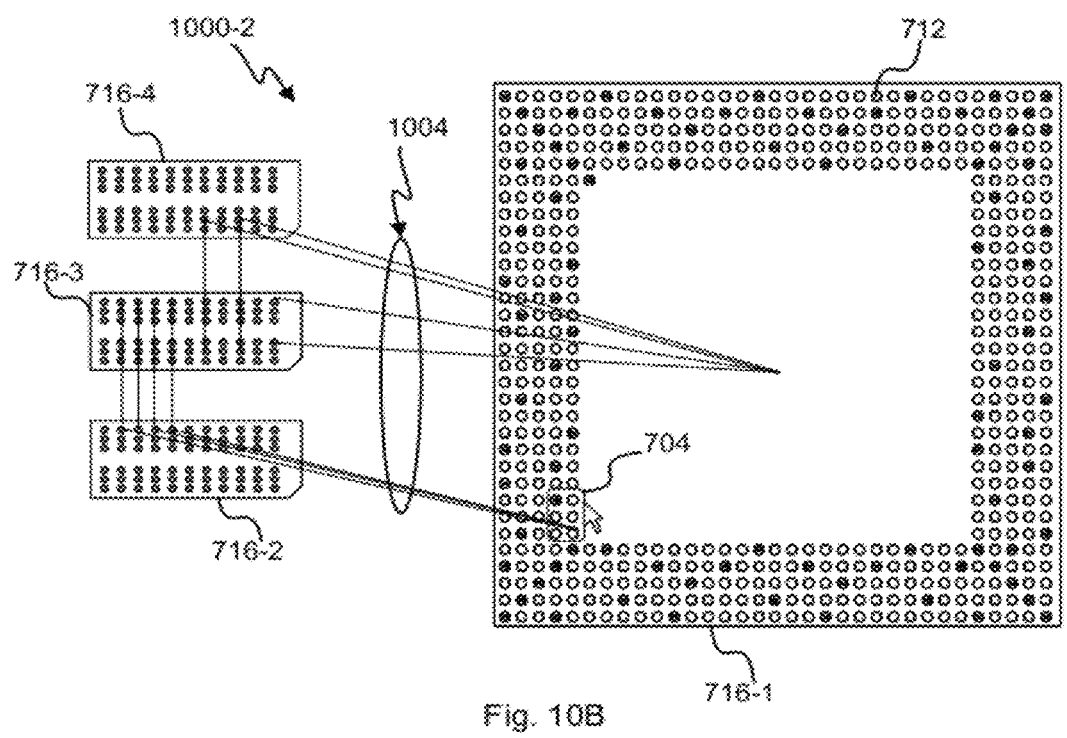

With reference to FIGS. 10A and 10B, an embodiment of a process to assign signal groups 704 to pins is demonstrated with two snapshots 1000 before and after assigning a group 704 to pins 712. When a design is initially loaded into the PCB physical layout tool 108, all the unassigned signal lines 1004 are initially pinned to a temporary position on the package object 716. In this example, the physical objects 716-1, 716-2, 716-3 had pins 712 individually assigned either in the block diagram domain or already in the physical layout domain.

The signal lines 1004 from the connector objects 716-2, 716-3, 716-4 in the first snapshot 1000-1 of FIG. 10A are all going to the center of the chip package object 716-1. The designer can use the hierarchical display module 152 to accentuate certain signal lines 404 in bold or a discriminating color by selecting the relevant signal(s) or group(s) 704 in the hierarchical display module 152. To ease selecting the correct signals and groups, the cursor can snap to the selected items in the hierarchical display module 152.

Using the cursor, the selected signal lines and/or groups can be dragged to individual pins as shown in FIG. 10B. In this example, a group 704 of six pins are moved as a group to pins 712 on the chip package object 716-1. Only three signals are in this group 704 with the remainder being power, ground or unused. The I/O planning tool 142 can be used to automatically assign the pins in the group while still allowing manual rearrangement. When manual movement violates a rule, the designer can be notified to take corrective action.

Figure 11A:
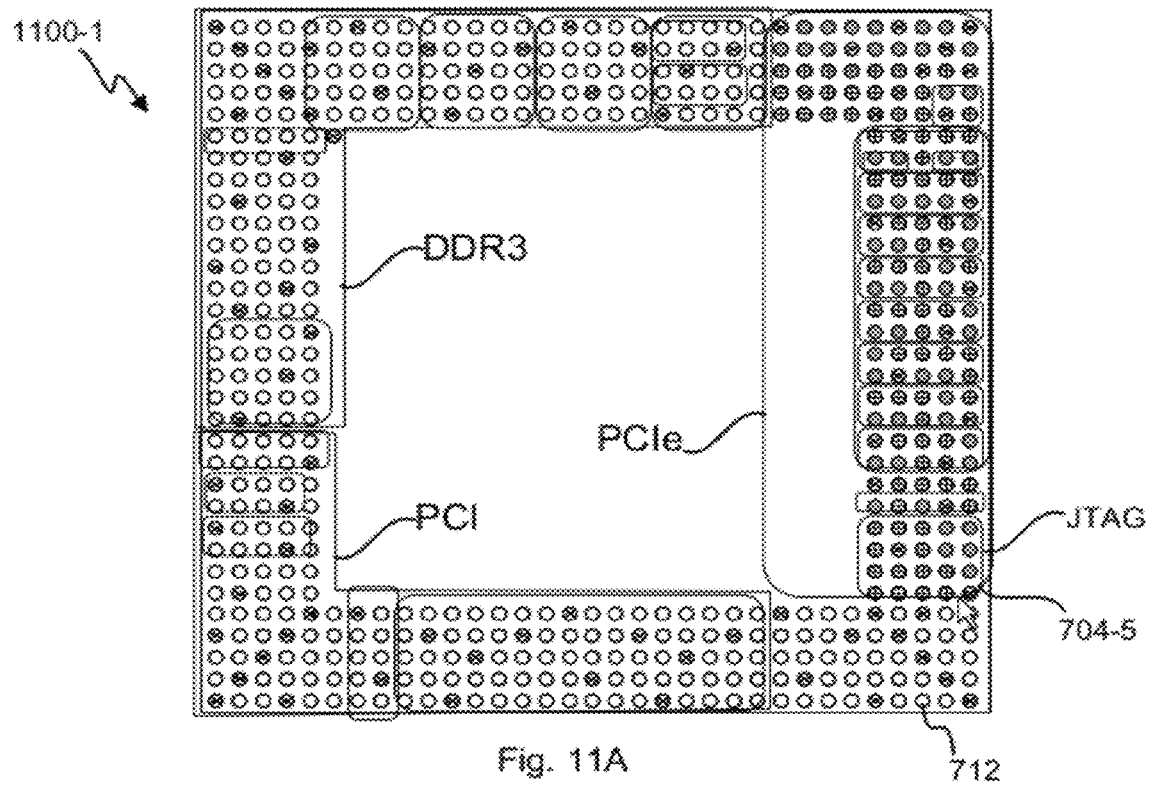
FIGS. 11A and 11B depict block diagrams of an embodiment of a package object before and after moving a group object.
Figure 11B:
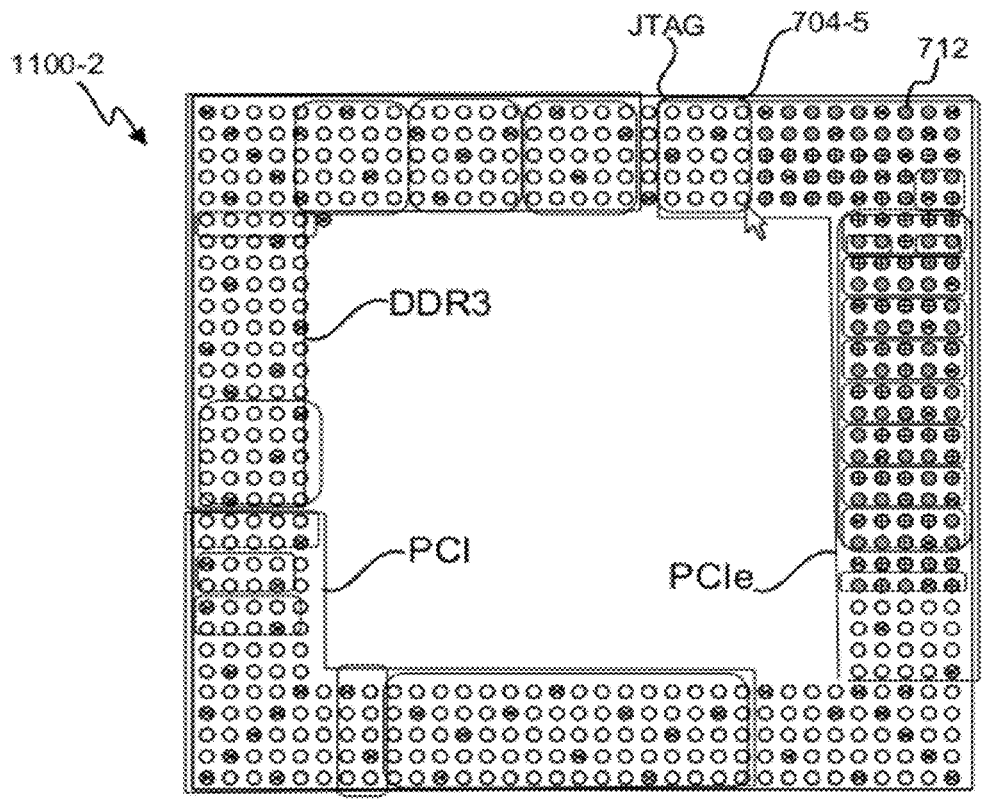

Referring next to FIGS. 11A and 11B, an embodiment of a process to move a signal group 704 is demonstrated with two snapshots 1100 before and after the move. With the cursor, the JTAG group 704-5 is chosen and dragged to a new location in the pins 712. The signals that were assigned to those pins can be moved to unassigned or moved elsewhere in the pins. The group 704 can be rotated as a unit. In this example, the group 704-5 is rotated ninety degrees and moved to a new location. The I/O planning tool 142 can adjust pin assignments in the group 704-5 as advised by the rules.

Figure 12A:
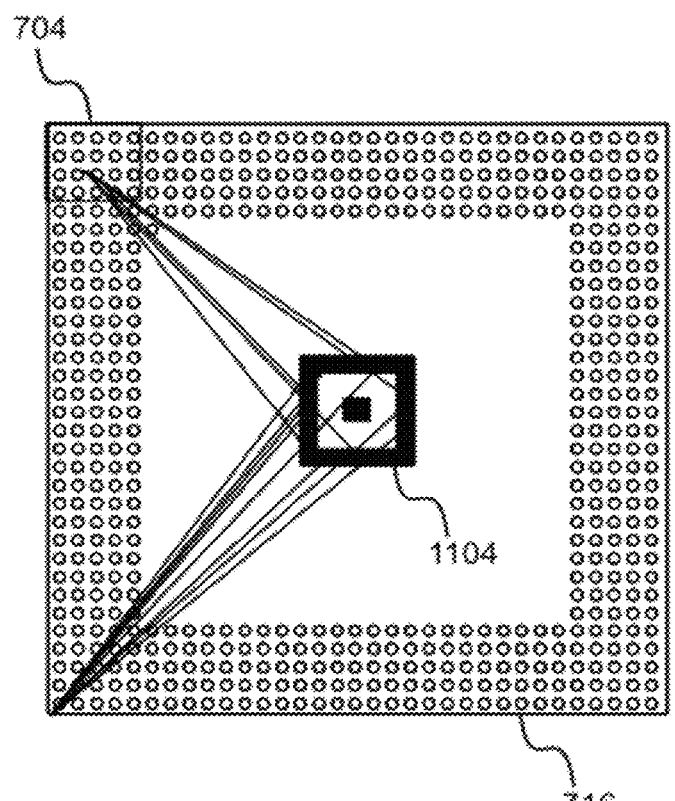
FIGS. 12A and 12B depict block diagrams of embodiments of schematic demonstrating a co-design environment where changes in one domain are reflected in the other.
Figure 12B:
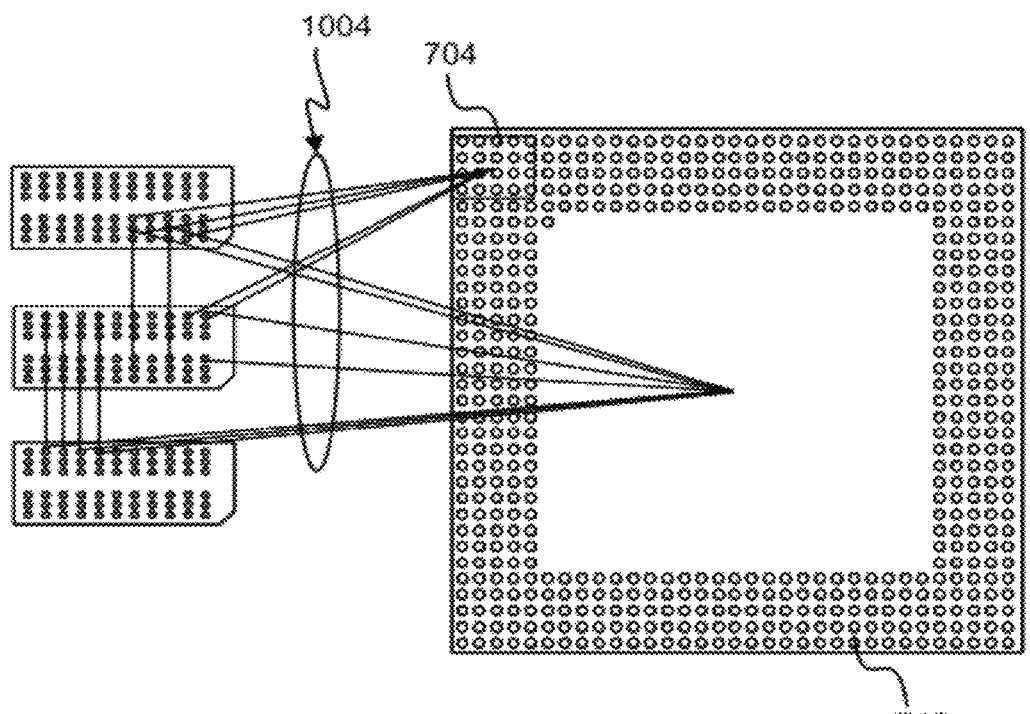

With reference to FIGS. 12A and 12B, an embodiment of a process of working with groups in a co-design environment is demonstrated. A die that has a custom package would have interface objects defined for the die 1204. Shown in FIG. 12A, a designer in the domain of the package design tool 116 can move the group 704 to pins on the physical object 716 using the IO planning tool 142. Unassigned signals from the die 1204 are temporarily pinned to the corner of the package object 716. In the domain of the PCB physical layout tool 108, that group 704 would also appear as assigned to pins as shown in FIG. 12B. Changes in the physical layout tool 108 would conversely be reflected in the package design tool 116. Co-design can be done for any custom package for a die or a multichip module.

Figure 13:
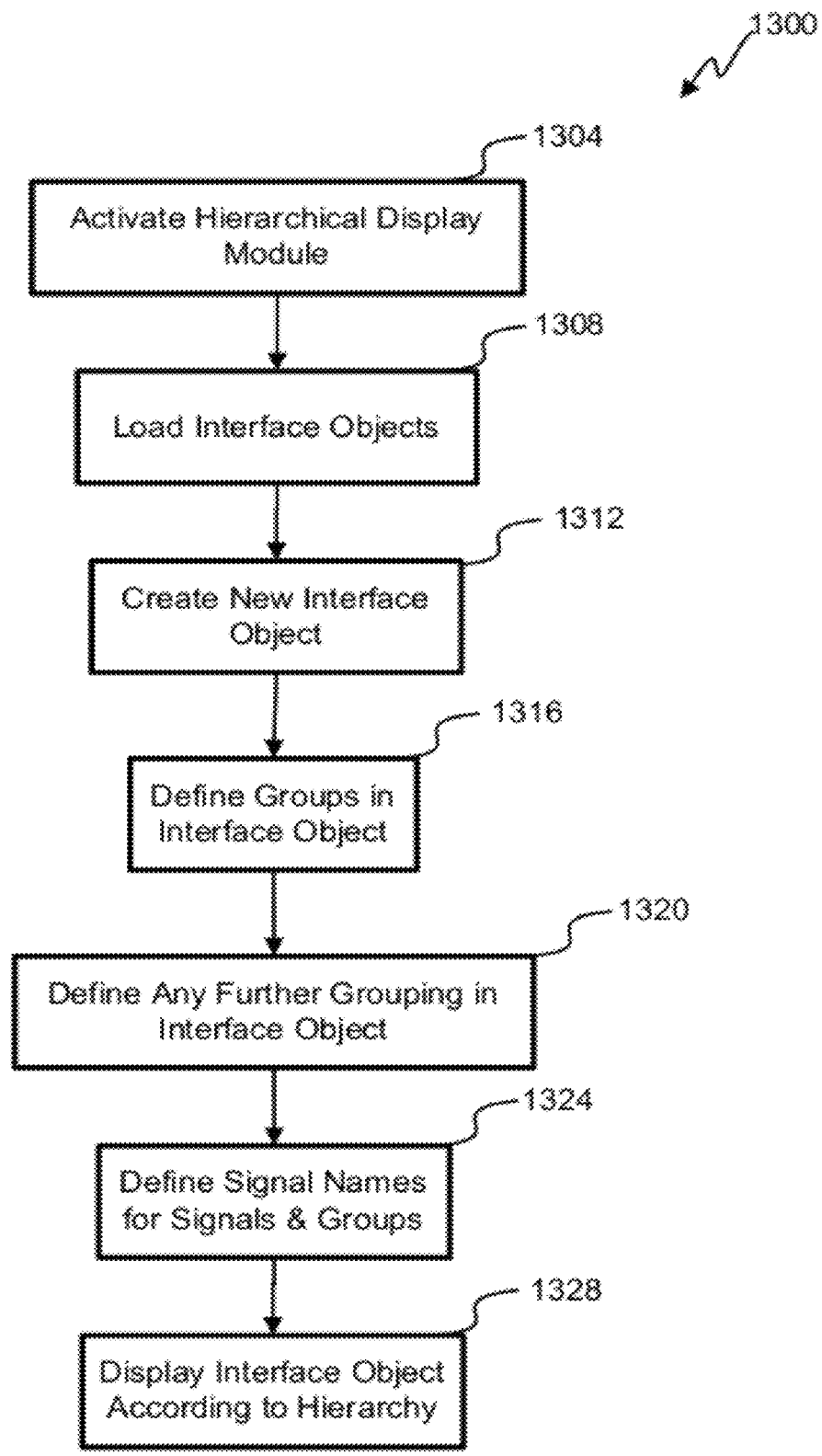
FIG. 13 illustrates a flowchart of an embodiment of a process for hierarchically defining an interface object.

With reference to FIG. 13, an embodiment of a process 1300 for hierarchically defining an interface object 312 is shown. The depicted portion for the process begins in block 1304 where the hierarchical display module 152 is activated. New interface objects 312 and signal objects 316 can be defined when a library version is not already available. In block 1308, the existing interface objects 312 are loaded. Missing interface objects 312 created in block 1312. An interface object 312 is first named and then groups are defined in block 1316. Sub-groups, sub-sub-groups and other levels of grouping can be defined optionally in block 1320.

Signal names are defined for the groups or individual signals in block 1324. In the design environment, the signal naming remains heterogeneous as any instance of a interface object 312 or signal object 316 is updated as that library component is updated. Once done editing the interface object (s) 312 in block 1328, hierarchical display module 152 can be used with the additional interface object.

Figure 14:
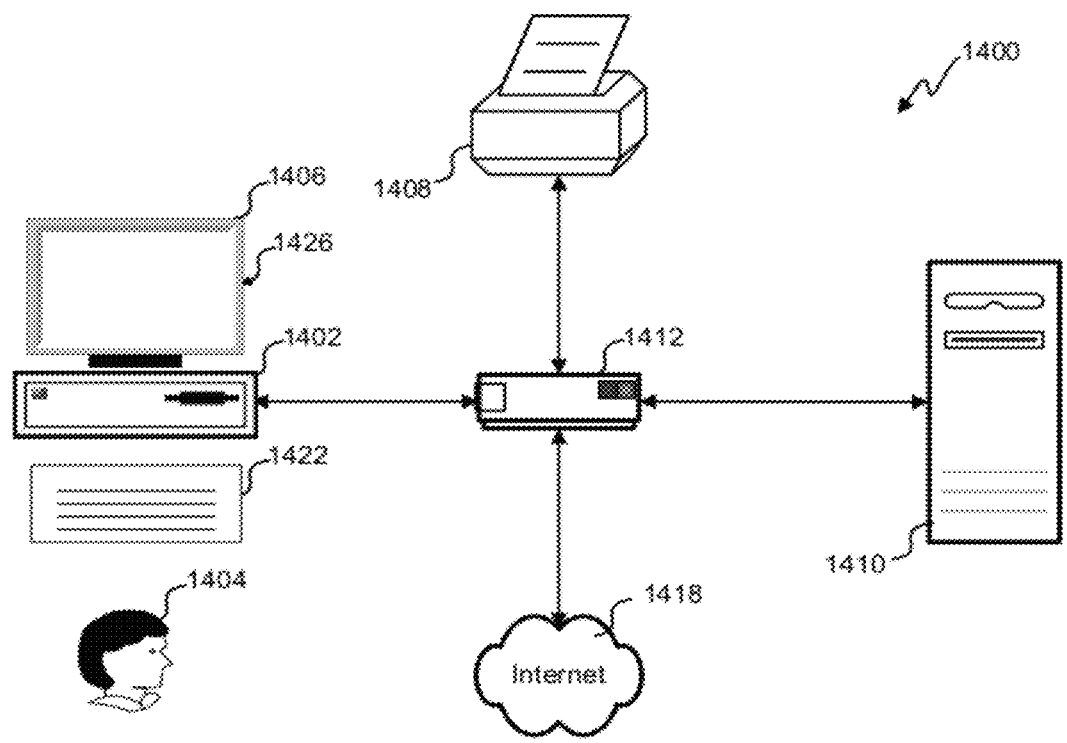
FIG. 14 depicts a block diagram of an embodiment of a CAD system.

Referring next to FIG. 14, an exemplary environment with which embodiments of the invention may be implemented is shown with a computer aided design (CAD) system 1400 that can be used by a designer 1404 to design, for example, electronic circuits. The CAD system 1400 can include a computer 1402, keyboard 1422, a network router 1412, a printer 1408, and a monitor 1406. The monitor 1406, processor 1402 and keyboard 1422 are part of a computer system 1426, which can be a laptop computer, desktop computer, handheld computer, mainframe computer, etc. The monitor 1406 can be a CRT, flat screen, etc.

A circuit designer 1404 can input commands into the processor 1402 using various input devices, such as a mouse, keyboard 1422, track ball, touch screen, etc. If the CAD system 1400 comprises a mainframe, a designer 1404 can access the computer 1402 using, for example, a terminal or terminal interface. Additionally, the computer system 1426 may be connected to a printer 1408 and a server 1410 using a network router 1412, which may connect to the Internet 1418 or a WAN.

The server 1410 may, for example, be used to store additional software programs and data. In one embodiment, software implementing the systems and methods described herein can be stored on a storage medium in the server 1410. Thus, the software can be run from the storage medium in the server 1410. In another embodiment, software implementing the systems and methods described herein can be stored on a storage medium in the computer 1402. Thus, the software can be run from the storage medium in the computer system 1426. Therefore, in this embodiment, the software can be used whether or not computer 1402 is connected to network router 1412. Printer 1408 may be connected directly to computer 1402, in which case, the computer system 1426 can print whether or not it is connected to network router 1412.

Figure 15:
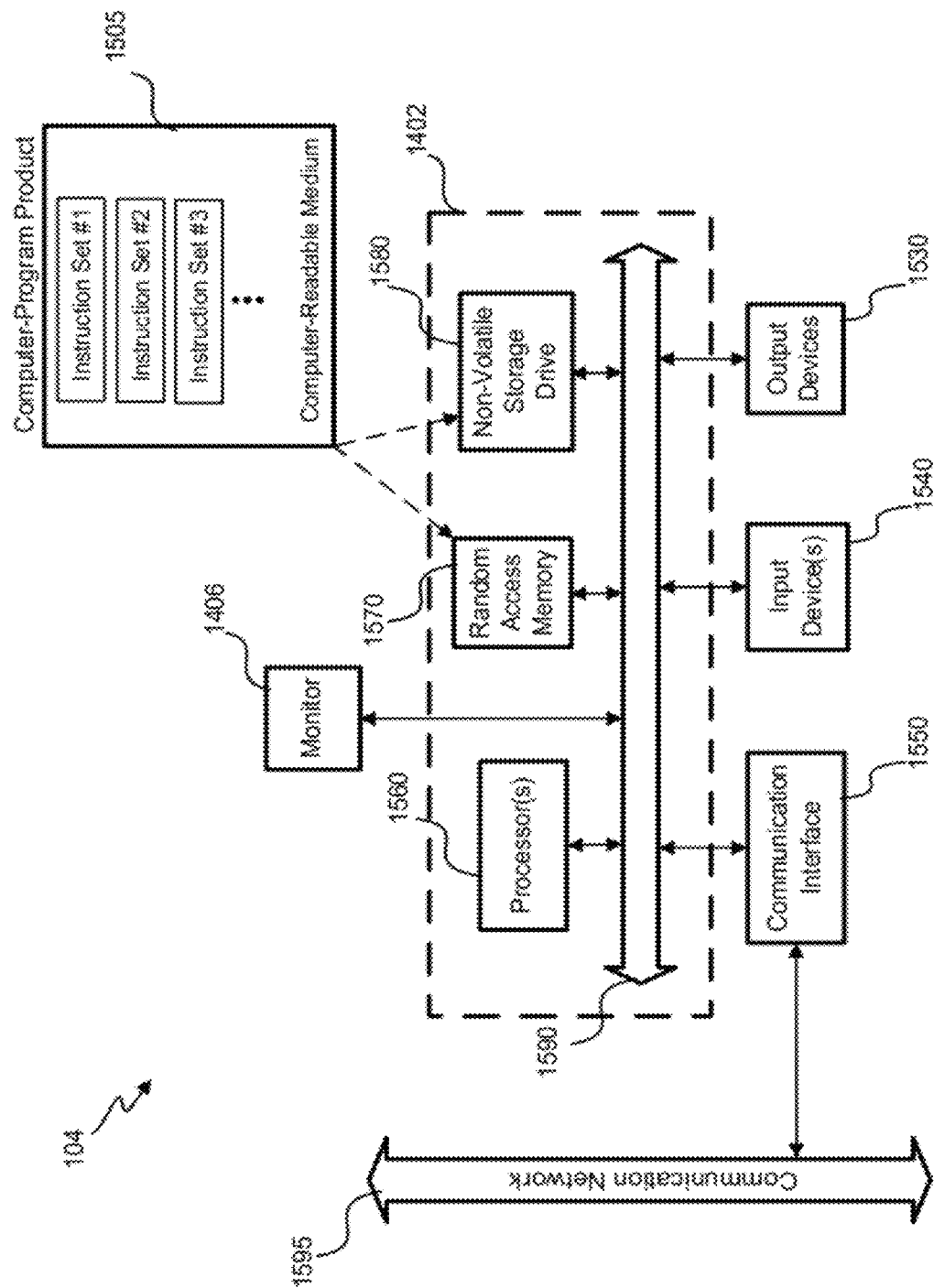
FIG. 15 depicts a block diagram of an embodiment of a special-purpose computer system.

With reference to FIG. 15, an embodiment of a special-purpose computer system 104 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 1426, it is transformed into the special-purpose computer system 104 for CAD.

Special-purpose computer system 104 comprises a computer 1402, a monitor 1406 coupled to computer 1402, one or more additional user output devices 1530 (optional) coupled to computer 1402, one or more user input devices 1540 (e.g., keyboard, mouse, track ball, touch screen) coupled to computer 1402, an optional communications interface 1550 coupled to computer 1402, a computer-program product 1505 stored in a tangible computer-readable memory in computer 1402. Computer-program product 1505 directs system 104 to perform the above-described methods. Computer 1402 may include one or more processors 1560 that communicate with a number of peripheral devices via a bus subsystem 1590. These peripheral devices may include user output device(s) 1530, user input device(s) 1540, communications interface 1550, and a storage subsystem, such as random access memory (RAM) 1570 and non-volatile storage drive 1580 (e.g., disk drive, optical drive, solid state drive), which are forms of tangible computer-readable memory.

Computer-program product 1505 may be stored in non-volatile storage drive 1580 or another computer-readable medium accessible to computer 1402 and loaded into memory 1570. Each processor 1560 may comprise a microprocessor, such as a microprocessor from Intel® or Advanced Micro Devices, Inc.®, or the like. To support computer-program product 1505, the computer 1402 runs an operating system that handles the communications of product 1505 with the above-noted components, as well as the communications between the above-noted components in support of the computer-program product 1505. Exemplary operating systems include Windows® or the like from Microsoft Corporation, Solaris® from Sun Microsystems, LINUX, UNIX, and the like.

User input devices 1540 include all possible types of devices and mechanisms for inputting information to computer system 1402. These may include a keyboard, a keypad, a mouse, a scanner, a digital drawing pad, a touch screen incorporated into the display, audio input devices such as voice recognition systems, microphones, and other types of input devices. In various embodiments, user input devices 1540 are typically embodied as a computer mouse, a trackball, a track pad, a joystick, wireless remote, a drawing tablet, a voice command system. User input devices 1540 typically allow a user to select objects, icons, text and the like that appear on the monitor 1406 via a command such as a click of a button or the like. User output devices 1530 include all possible types of devices and mechanisms for outputting information from computer 1402. These may include a display (e.g., monitor 1406), printers, non-visual displays such as audio output devices, etc.

Communications interface 1550 provides an interface to other communication networks and devices and may serve as an interface for receiving data from and transmitting data to other systems, WANs and/or the Internet 1418. Embodiments of communications interface 1550 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1550 may be coupled to a computer network, to a FireWire® bus, or the like. In other embodiments, communications interface 1550 may be physically integrated on the motherboard of computer 1402, and/or may be a software program, or the like.

RAM 1570 and non-volatile storage drive 1580 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1570 and non-volatile storage drive 1580 may be configured to store the basic programming and data constructs that provide the functionality of various embodiments of the present invention, as described above.

Software instruction sets that provide the functionality of the present invention may be stored in RAM 1570 and non-volatile storage drive 1580. These instruction sets or code may be executed by the processor(s) 1560. RAM 1570 and non-volatile storage drive 1580 may also provide a repository for storing data and data structures used in accordance with the present invention. RAM 1570 and non-volatile storage drive 1580 may include a number of memories including a main random access memory (RAM) for storage of instructions and data during program execution and a read-only memory (ROM) in which fixed instructions are stored. RAM 1570 and non-volatile storage drive 1580 may include a file storage subsystem providing persistent (non-volatile) storage for program and/or data files. RAM 1570 and non-volatile storage drive 1580 may also include removable storage systems, such as removable flash memory.

Bus subsystem 1590 provides a mechanism for letting the various components and subsystems of computer 1402 communicate with each other as intended. Although bus subsystem 1590 is shown schematically as a single bus, alternative embodiments of the bus subsystem may utilize multiple busses or communication paths within the computer 1402.

Interfaces between PCB domains occur at connectors, packages or other components. Typically, components use pins, pads, bumps, balls, traces, vias or other mechanisms to connect to signals. Throughout the disclosure, the term "pin" may be used, but it should be generally understood that any of these connection mechanisms could be used interchangeably. Co-design packages are another domain where signals are routed from pins through a PCB in the package substrate to a semiconductor chip. The innovations discussed above can also be used within the co-design package.

While the principles of the disclosure have been described above in connection with specific apparatuses and methods, it is to be clearly understood that this description is made only by way of example and not as limitation on the scope of the disclosure.

What is claimed is:

1. A printed circuit board (PCB) block diagram tool for block diagram level editing of a PCB design abstracted from a PCB physical layout tool, the PCB block diagram tool comprising:
   a plurality of interface objects representing interfaces between components, wherein each of the plurality of interface objects include a plurality of signal, power and ground signal lines without defined physical assignment to pin or pad;
   a plurality of block objects representing a plurality of physical objects in the PCB physical layout tool, wherein the plurality of blocks are configured to accept the plurality of interface objects;
   the plurality of interface objects can be assigned to a block object without requiring mapping to pins or pads; and
   interconnect lines that connect the plurality of interface objects between the plurality of block objects.

2. The PCB block diagram tool for block diagram level editing of the PCB design abstracted from the PCB physical layout tool as recited in claim 1, wherein the PCB block diagram tool is used do capture a system definition.

3. The PCB block diagram tool for block diagram level editing of the PCB design abstracted from the PCB physical layout tool as recited in claim 1, further comprising a tool component that maps each of the plurality of block objects to the plurality of physical objects.

4. The PCB block diagram tool for block diagram level editing of the PCB design abstracted from the PCB physical layout tool as recited in claim 1, wherein the physical objects virtually describe connectors and/or packages in a domain of the PCB physical layout tool with dimensioning and pin configuration.

5. The PCB block diagram tool for block diagram level editing of the PCB design abstracted from the PCB physical layout tool as recited in claim 1, wherein the plurality of interface objects defines signal grouping and signal names.

6. The PCB block diagram tool for block diagram level editing of the PCB design abstracted from the PCB physical layout tool as recited in claim 1, further comprising an interface between the PCB block diagram tool and the PCB physical layout tool, wherein the PCB physical layout tool comprises a plurality of physical objects that correspond to the plurality of block objects.

7. The PCB block diagram tool for block diagram level editing of the PCB design abstracted from the PCB physical layout tool as recited in claim 1, further comprising an interface between the PCB block diagram tool and the PCB physical layout tool, wherein:
the PCB physical layout tool is passed names of the plurality of signal, power and ground lines, and
the names are preserved in the PCB physical layout tool regardless of whether the names are assigned to pins or pads.

8. A computer-implemented method for using a PCB block diagram tool for block diagram level editing of a PCB design abstracted from a PCB physical layout tool, the method comprising:
providing a plurality of interface objects representing interfaces between components, wherein each of the plurality of interface objects include a plurality of signal, power and ground signal lines without defined physical assignment to pin or pad;
providing a plurality of block objects representing a plurality of physical objects;
receiving indication of which of the plurality of interface objects should be associated with the plurality of blocks without requiring mapping to pins or pads;
assigning the plurality of interface objects to the plurality of blocks;
receiving indication of how interconnect lines connect the plurality of interface objects with the plurality of block objects; and
assigning interconnect lines using a computer.

9. The method for using a PCB block diagram tool for block diagram level editing of the PCB design abstracted from the PCB physical layout tool as recited in claim 8, further comprising mapping each of the plurality of block objects to the plurality of physical objects.

10. The method for using a PCB block diagram tool for block diagram level editing of the PCB design abstracted from the PCB physical layout tool as recited in claim 8, wherein the plurality of physical objects virtually describe connectors and/or packages in a domain of the PCB physical layout tool.

11. The method for using a PCB block diagram tool for block diagram level editing of the PCB design abstracted from the PCB physical layout tool as recited in claim 8, wherein the plurality of interface objects define signal grouping and signal names.

12. The method for using a PCB block diagram tool for block diagram level editing of the PCB design abstracted from the PCB physical layout tool as recited in claim 8, further comprising passing information between the PCB block diagram tool and the PCB physical layout tool while preserving abstraction in the plurality of interface objects from defined physical assignment to pins and pads, wherein the PCB physical layout tool comprises a plurality physical objects that correspond to the plurality of block objects.

13. The method for using a PCB block diagram tool for block diagram level editing of the PCB design abstracted from the PCB physical layout tool as recited in claim 8, further comprising passing the PCB physical layout tool names of the plurality of signal, power and ground lines, wherein the names are preserved in the PCB physical layout tool regardless of whether the names are assigned to pins or pads.

14. A non-transitory machine-readable storage medium comprising executable instructions for a PCB block diagram tool that provides block diagram level editing of a PCB design abstracted from a PCB physical layout tool, the executable instructions comprising code for:
receiving indication of which of a plurality of interface objects should be associated with a plurality of blocks, wherein:
the plurality of interface objects represent interfaces between components,
each of the plurality of interface objects include a plurality of signal, power and ground signal lines without defined physical assignment to pin or pad, and
the plurality of block objects represent a plurality of physical objects;
assigning the plurality of interface objects to the plurality of blocks without requiring mapping to pins or pads;
receiving indication of how interconnect lines connect the plurality of interface objects with the plurality of block objects; and
assigning interconnect lines.

15. The non-transitory machine-readable storage medium comprising executable instructions for the PCB block diagram tool that provides block diagram level editing of the PCB design abstracted from the PCB physical layout tool as recited in claim 14, further comprising code for mapping each of the plurality of block objects to the plurality of physical objects.

16. The non-transitory machine-readable storage medium comprising executable instructions for the PCB block diagram tool that provides block diagram level editing of the PCB design abstracted from the PCB physical layout tool as recited in claim 14, further comprising code for passing information between the PCB block diagram tool and the PCB physical layout tool while preserving abstraction in the plurality of interface objects from defined physical assignment to pins and pads, wherein the PCB physical layout tool comprises a plurality of physical objects that correspond to the plurality of block objects.

17. The non-transitory machine-readable storage medium comprising executable instructions for the PCB block diagram tool that provides block diagram level editing of the PCB design abstracted from the PCB physical layout tool as recited in claim 14, further comprising code for passing the PCB physical layout tool names of the plurality of signal, power and ground lines, wherein the names are preserved in the PCB physical layout tool regardless of whether the names are assigned to pins or pads.

* * * * *